May 19, 1942.  H. D. GEYER  2,283,674
ESCUTCHEON FOR AUTO DOORS
Filed Aug. 13, 1938  2 Sheets-Sheet 1

INVENTOR
Harvey D. Geyer
BY
Spencer Hardman & Felker
his ATTORNEYS

May 19, 1942.  H. D. GEYER  2,283,674
ESCUTCHEON FOR AUTO DOORS
Filed Aug. 13, 1938  2 Sheets-Sheet 2
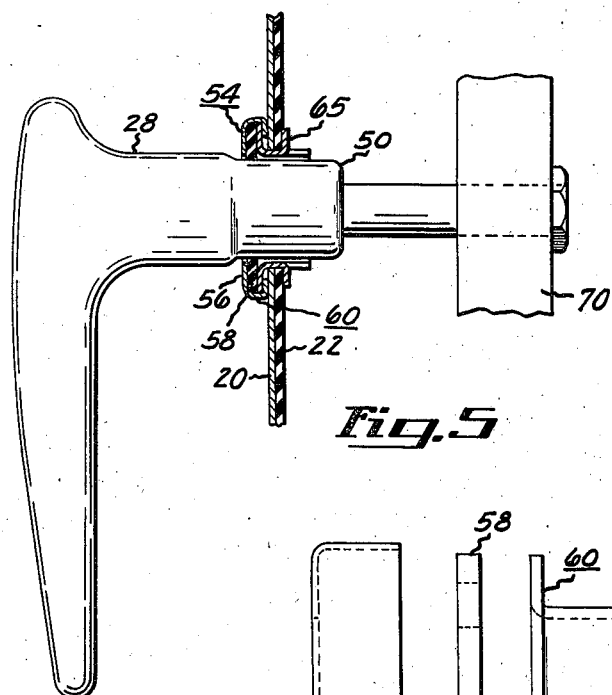
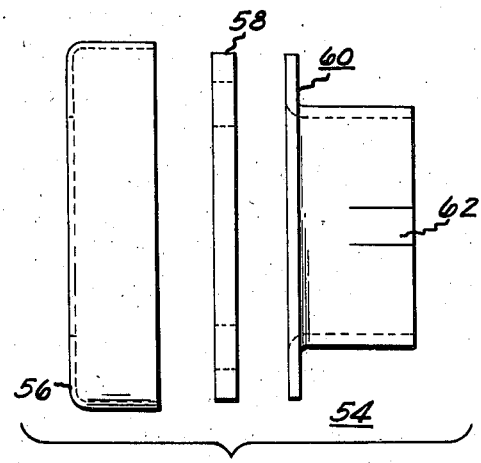
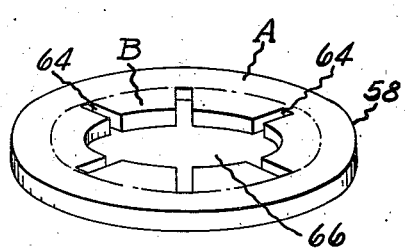
INVENTOR
Harvey D. Geyer.
BY
his ATTORNEYS Patented May 19, 1942

2,283,674

UNITED STATES PATENT OFFICE 2,283,674

ESCUTCHEON FOR AUTO DOORS

Harvey D. Geyer, Dayton, Ohio, assignor to General Motors Corporation, Detroit, Mich., a corporation of Delaware Application August 13, 1938, Serial No. 224,710

4 Claims. (Cl. 292—357)

This invention relates to grommets and is particularly concerned with anti-rattle grommets for use in connection with automobile door handles and the like.

An object of the invention is to provide a grommet assembly which will snugly embrace a movable member, for example a door handle, and which at the same time will permit free axial or radial movement thereof while substantially preventing lateral movement thereof relative to the stationary member, or door.

It is a further object of the invention to provide a grommet assembly which includes metallic lugs thereon that function both as the means for securing the grommet to the door and as resilient bearing spacers for the door handle.

A still further object of the invention is to provide a grommet assembly which includes an annular bearing ring therein, said ring comprising an annular outer portion of hard rubber which is gripped by the metallic parts of the assembly and an annular inner portion of relatively softer rubber which embraces a door handle and prevents rattling due to lateral movement thereof.

Further objects and advantages of the present invention will be apparent from the following description, reference being had to the accompanying drawings wherein a preferred embodiment of the present invention is clearly shown.

In the drawings:

Fig. 5 shows another embodiment of grommet construction.

Fig. 6 is an expanded view of the modified grommet construction showing the individual parts thereof, and Fig. 7 is a view, in perspective, of the rubber bearing ring as used in connection with the grommet assembly shown in Fig. 5.

Figure 1:
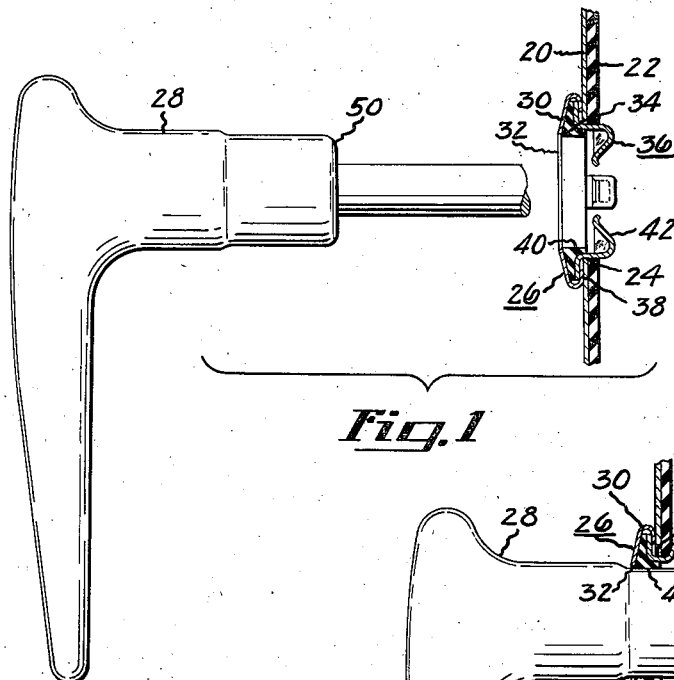
Fig. 1 illustrates a preferred form of grommet assembly inserted in a door panel, prior to the assembly of the door handle.

Referring to Fig. 1, 20 illustrates a metallic door panel, as commonly used in automobile body construction, which is preferably covered at the inner side thereof with a suitable sound deadening material 22. The panel 20 has an aperture 24 therethrough which is utilized to accommodate a grommet assembly 26 which supports a door handle 28. The grommet assembly 26 includes an annular metallic cup-shaped member 30 having an aperture 32 therethrough. The member 30 encases an annular soft rubber ring 34 that fits, within the cup and, is held in position by a metallic ring 36, which fits over the rubber ring 34 and which is held to the cup 30 by rolling over the edge 38 of the cup 30. In this manner the cup 30, resilient rubber ring 34 and metallic ring 36 are held together as a unit. It will be noted that the diameter of the aperture 40, which is provided in the rubber ring 34, is of less diameter than the diameter of aperture 32 in the cup member 30, this preventing metallic contact between the door handle and grommet when the same are assembled as will be described in detail hereinafter. The metallic ring 36 has a plurality of outwardly extending metallic lugs 42 thereon formed integrally therewith. The lugs 42 have inwardly extending portions 44 and are preferably curved upwardly, as at 46, at the ends thereof to provide smooth bearing points thereon. The portions 44 of lugs 42 are cupped as at 48 to reinforce the same.

Figure 2:
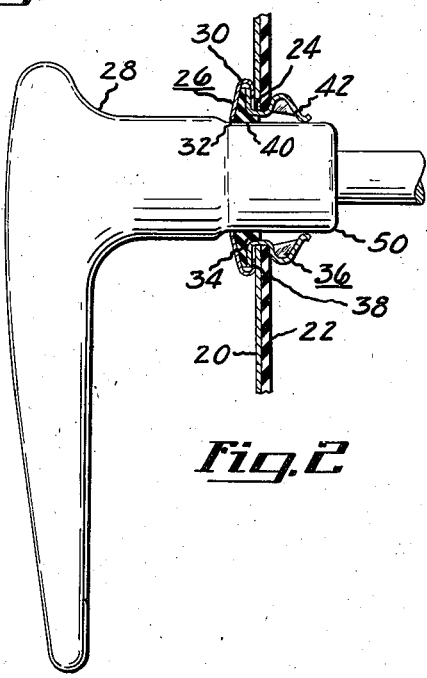
Fig. 2 is a view similar to Fig. 1 wherein the door handle has been inserted within the grommet assembly.
Figure 3:
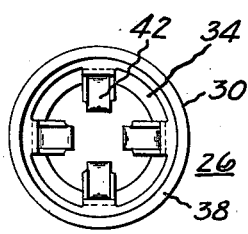
Fig. 3 is an end view of the grommet assembly shown in Fig. 1.
Figure 4:
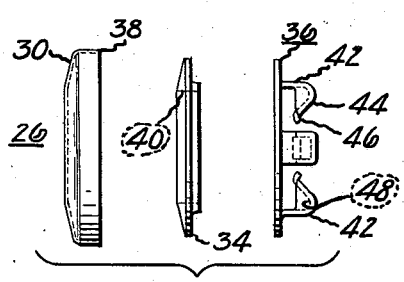
Fig. 4 is a view of the grommet assembly in expanded form showing the individual parts thereof.

The grommet 26 is assembled to the door panel by passing the same through the aperture 24, the outer dimensions across the lugs 42 being slightly less than the diameter of the aperture 24. The metallic ring 36 is of greater diameter than the dimension across the lug 42 and rests upon the outer surface of the door panel 20 and thereby conceals the edges of the aperture. After the grommet 26 is in position within the door panel 20, the handle 28 is inserted therein and passed therethrough. It will be noted that the handle 28 is rounded as at 50 to facilitate the entry of the handle into the grommet. The diameter of the door handle is slightly greater than the diameter of the aperture 40 through rubber ring 34. Thus the ring 34 is slightly expanded radially outwardly by the door handle and resiliently embraces the same. Further inward movement of the door handle causes the rounded end 50 thereof to engage the inwardly extending portions 44 of lugs 42. Continued inward movement of the handle bends the lugs 42 outwardly to, in effect, clamp the grommet to the door panel as noted in Fig. 2. In this position the rounded ends of the lugs 42 resiliently bear upon the inner end of the door handle and aid in centering the same and in preventing lateral movement thereof. In this manner the lugs 42 perform the dual purpose of functioning as clamping means to associate the grommet with the door panel and as resilient means for centering the door handle within the grommet. It is apparent that the present construction eliminates many assembly problems heretofore present as it is merely necessary to insert the grommet in the hole in the door panel and then press the handle therethrough. It is manifest that a tool can be used to spread the lugs into clamping relation with the door panel in the event that the assembly of the door handle is not desired.

Another embodiment of my invention is shown in Fig. 5 wherein a grommet assembly 54 is provided. A grommet assembly 54 includes a cup-shaped member 56, an annular rubber ring 58 and a flanged sleeve 60. The assembly of the grommet is similar to the assembly of the grommet shown in Fig. 1, that is the rubber ring is placed within the cup and the flanged sleeve is inserted on top of the ring whereupon the cup is rolled over the flanged portion of the sleeve to make the assembly unitary. The sleeve 60 includes a plurality of slotted portions 62 which may be bent outwardly at 65 as noted in Fig. 5 for clamping the grommet 54 to the door panel 20.

The rubber ring 58 as shown in the present embodiment is formed of two grades of rubber, the outer portion thereof as designated at A being formed of hard rubber whereas the inner portion as designated at B is formed of relatively softer rubber. In order to provide greater resiliency in the soft rubber portion thereof, ring 58 is provided with a plurality of radially extending slots 64. The aperture 66 in the ring 58 is of slightly less diameter than the diameter of the door handle 28, and therefore when the door handle is passed therethrough it is snugly embraced by the inner periphery of the ring 58. It will be noted that in the assembly of the grommet that the hard rubber portion A of ring 58 is clamped between the cup and flange sleeve, whereas the softer rubber portion B thereof is substantially free due to the construction of the metallic parts of the grommet. In this manner the ring 58 permits radial or reciprocal movement of the door handle while substantially preventing any lateral movement thereof.

The method of fabricating a rubber ring such as ring 58 is carried out by molding rubbers having different curing times or by making a hard rubber ring and a soft rubber ring and then assembling the rings and subsequently vulcanizing the two rings together. Such fabrication methods being well known to the persons skilled in the art.

In the preferred embodiment of the invention the rubber ring portions have an inclusion of graphite therein to act as a lubricant for the door handle.

In either of the embodiments described the inner end of the handle is usually supported by the latch lock assembly as shown at 70 in Fig. 5.

From the foregoing it is apparent that I have provided a grommet construction which is inexpensive and easy to install. Furthermore due to the design thereof the door handle is held out of metallic contact with adjacent metallic parts and is prevented from rattling in the door due to lateral movement thereof. The rubber bearing ring permits radial or reciprocal movement of the handle and the resilience of the rubber ring which is under slight compression, compensates for wear.

While the embodiment of the present invention as herein disclosed, constitutes a preferred form, it is to be understood that other forms might be adopted, all coming within the scope of the claims which follow.

What is claimed is as follows:

1. An anti-rattle grommet for a door handle comprising an annular ring of rubber, including a plurality of inwardly extending serrated portions of more resilient rubber than the remainder of the ring, and metallic clamping means for holding said ring and for attaching the assembled grommet to a door panel.

2. An anti-rattle grommet for a door handle comprising in combination, an annular ring, including an outer portion of hard rubber and an inner portion of relatively softer rubber, a plurality of radially extending slots in said soft rubber portion, and means for confining the ring and for attaching the same to a door panel, said means clamping the ring around the hard rubber portion thereof.

3. An anti-rattle grommet for a door handle including a ring of soft rubber, an apertured cup for holding said ring, a metallic ring of annular formation of slightly less diameter than said cup, whereby the metallic ring may be inserted in said cup and clamped thereto for holding the rubber ring therebetween, and a plurality of outwardly extending resilient integral lugs on said metallic ring, for clamping the grommet to a door panel and for centering a handle passed therethrough and thereby preventing rattling of the handle.

4. An anti-rattle grommet for a door handle comprising in combination, an annular cup shaped member, a flanged sleeve portion adapted to fit within said cup shaped member, an annular resilient part adapted to be placed between the sleeve portion and the cup member for spacing the member from the portion said cup member being adapted to be rolled over said portion for clamping the portion, cup member, and annular resilient part into a unitary assembly, and a plurality of longitudinal extensions on said sleeve portion, said extensions being adapted to function as centering means for a door handle and simultaneously to clamp the grommet to a door panel.

HARVEY D. GEYER.